Aug. 20, 1935.  A. RAVA  2,011,873
HIGH TEMPERATURE TORCH
Filed May 15, 1933
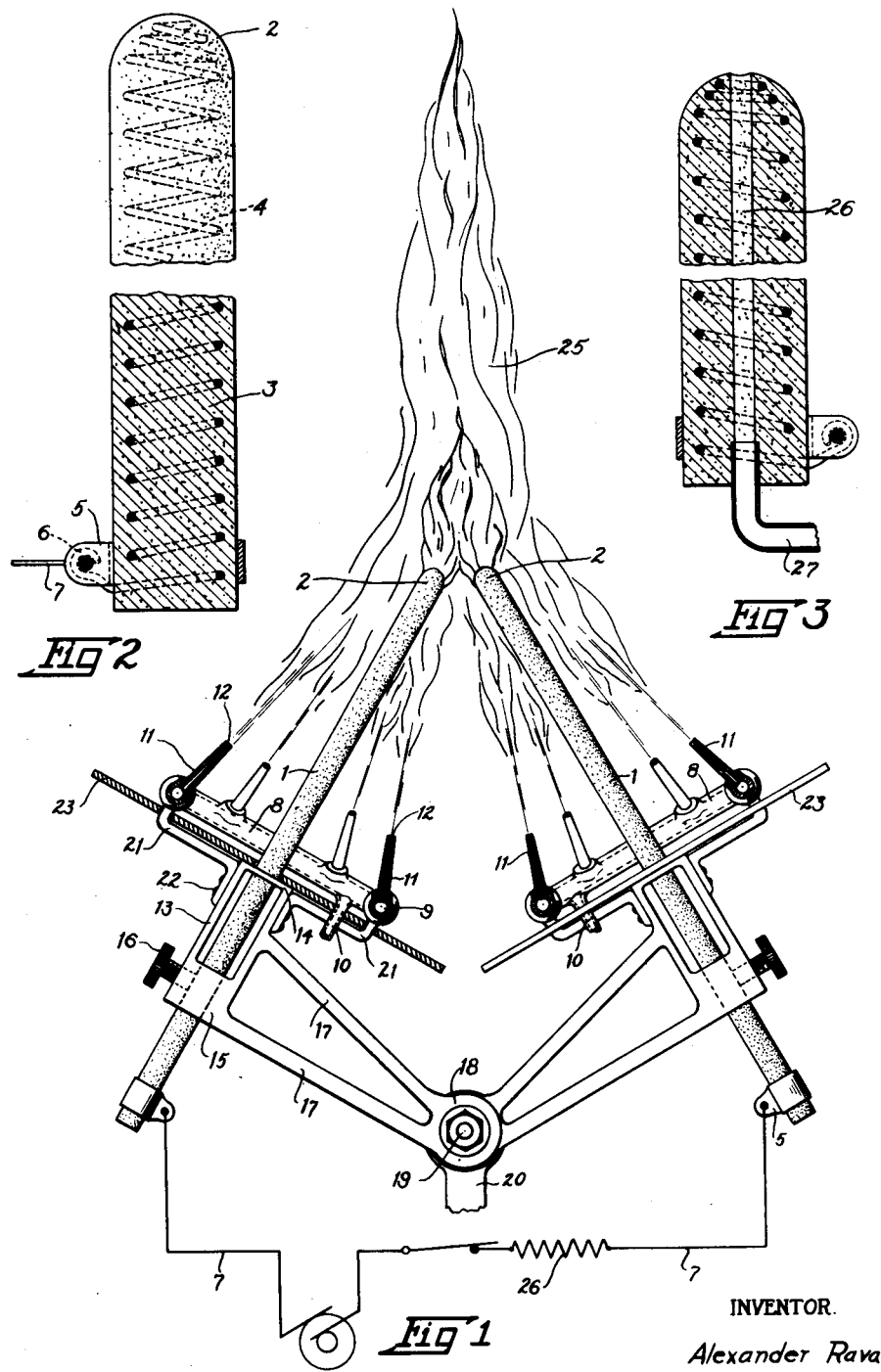
INVENTOR.
Alexander Rava.
BY
Slough and Canfield
ATTORNEYS.

Patented Aug. 20, 1935

2,011,873

UNITED STATES PATENT OFFICE 2,011,873

HIGH TEMPERATURE TORCH

Alexander Rava, Chicago, Ill.

Application May 15, 1933, Serial No. 671,152

14 Claims. (Cl. 219—8)

This invention relates to methods and means for producing high temperature flames.

Although my invention has numerous applications, it is particularly applicable to the production of non-reducing flames for use in the various metallurgical, chemical, ceramic and other allied arts. An illustrative use is the fusing and melting of refractory material and/or the glazing of the same and/or the depositing thereon of a layer or layers of glazed material, metals, etc.

It is an object of my invention to provide an improved method and means for producing a high temperature flame.

Another object is to provide a method and means of producing a high temperature flame in a unitary torch or like construction.

Another object is to provide an improved method and means for producing a high temperature oxidizing or non-reducing flame.

Another object is to provide an improved method and means for producing a high temperature flame by which refractory material may be fused and/or melted without the introduction thereinto of impurities.

Another object is to provide an improved method and means for producing a high temperature flame for glazing refractory material and the like.

Another object is to provide an improved method and means for applying a layer of glaze or molten metal or the like to refractory or like material.

Another object is to provide an improved method and means for producing a high temperature flame by the joint action of an electric arc and a combustible gas.

Other objects will be apparent to those skilled in the art to which my invention appertains.

My invention is fully disclosed in the following description taken in connection with the accompanying drawing, in which:

Fig. 1 is a top plan view of a flame-producing apparatus or torch embodying my invention and whereby the method of my invention may be practiced;

Fig. 2 is a view partly in longitudinal section illustrating to a relatively large scale an electrode which I may employ and shown to a smaller scale in Fig. 1;

Fig. 3 is a view similar to Fig. 2 but illustrating a modification.

Referring to the drawing, I have shown at 1—1 a pair of electrodes supported in a manner to be described at an angle to each other of 90° or less converging toward each other and adapted to be engaged and disengaged at their extreme end portions or arcing tips 2—2.

The electrodes 1—1 may be made of various materials but in the preferred practice of my invention I choose the material for the electrodes 1—1 in suitable correspondence with the material on which the flame to be produced is to operate, in order that any component material from the electrode 1 which is carried therefrom to the work will not be in the nature of an impurity therein. For example, where the flame to be produced is to operate upon a refractory having a zirconium dioxide base, the electrode 1 may be suitably made from zirconium dioxide or from the same in combination with zirconium metal. Such electrodes are fully described in my copending application Serial No. 671,148, filed May 15, 1933, and reference may be had thereto for a complete description of several forms.

In Fig. 2 of the instant application I have illustrated one form of such electrode. It comprises an elongated cylindrical body composed largely of zirconium dioxide 3 and having throughout the length thereof a helix or spiral 4 of zirconium metal wire or tape. The rearward end or the end opposite the arcing tip 2 has thereon a clamp device 5 to which an end portion 6 of the zirconium wire is secured. A conducting wire 7 is also secured to the clamp device 5.

As shown in Fig. 1, the two wires 7 may be connected to a suitable source of alternating current.

The zirconium dioxide of the electrode, besides being material, which will not contaminate the refractory upon which the flame is to operate in a manner to be described, facilitates ionization of the atmosphere at the arc and the projection of the arc into a flame discharge; and the zirconium metal in the electrode renders it electrically conductive particularly in the cooler portions thereof and before the heat of the flame has raised the temperature of the zirconium dioxide sufficiently to lower its resistance to current flow; and the zirconium metal itself yielding no impurities if carried into the work since it burns to zirconium dioxide.

At 8—8 I have illustrated a pair of gas burners comprising each an annular head or tube 9 with which communicates a gas supply conduit 10 through which gas under pressure may be supplied to the annular tube 8. A plurality of nozzle pieces 11—11 communicating with the interior of the tube 8 project generally forwardly therefrom, each provided with a discharge orifice 12.

The nozzle pieces 11 are disposed in an annular circle or series around the axis of the electrode 1 and inclined toward the axis so that gas issuing from the orifices 12 will flow in streams directed to converge or meet substantially at the tip 2 of the electrode.

Means may be provided to support the electrodes in their angular relation described, and to permit their arcing tips to be engaged and drawn apart to strike an arc therebetween, and to support the nozzle pieces in the predetermined relation above described relative to the electrodes, and to permit the electrodes to be adjusted longitudinally to compensate for consumption of the arcing tips. One form of construction which may be used is illustrated in Fig. 1. An open frame 13 extending longitudinally of the electrodes has transverse portions 14 and 15 provided with suitable axially aligned perforations through which the electrode is projected. The portion 15 may have a set screw 16 or other clamping means for permitting longitudinal adjustment of the electrode and for securing it to the frame in any adjusted position.

The frame has arms 17—17 projecting inwardly, terminating in a head 18 adapted to be pivotally mounted as at 19 upon a support 20; the head 18 is provided with insulation so as to electrically insulate the pairs of the arms 17 from each other. By this means, the electrode tips 2 may be moved toward and from each other to strike an arc therebetween and to draw the arc upon separation of the tips, and the electrodes 1 may be supported on the base 20.

The annular tubes 8 have two or more brackets 21—21 provided with eyes encircling the tubes and with arms extending inwardly and downwardly and secured as at 22 to the frame 13. By this means, the burners are maintained in fixed predetermined relation to their respective electrodes and move therewith so that the flame jets are always directed toward the same point on the electrodes in all positions of the latter.

Due to the intense heat generated by the flame, which will presently be described, radiant heat therefrom is preferably intercepted by shields 23—23 supported on the brackets 21 and extending transversely of the electrodes immediately under the burners. The shields may be formed from any suitable material or may be internally chambered in a manner not shown and cooling medium circulated therethrough.

If desired, automatic means well known in the electric arc producing art may be provided to feed the electrodes 1—1 forwardly to maintain a gap of constant width between the arcing tips to correspondingly maintain a constant arc therebetween.

The burner tubes 8 and nozzle pieces 11 may be made from any suitable refractory material but preferably I employ fused silica for this purpose.

The conduits 10 are connected to a source of gas under pressure, not shown, and the source may be provided with pressure regulating means well understood in the art. Any suitable combustible gas may be employed but I prefer to use oxy-hydrogen or oxy-acetylene.

To put the torch above described in operation, I first turn on the gas and ignite the jet issuing from the orifices 12—12 and adjust the pressure to cause the burning jets to converge approximately at the arc tip portions 2—2. The heat from these flames will heat the electrodes and lower their normally high resistance, particularly where electrodes of zirconium dioxide are employed; and when they are sufficiently hot to conduct electric current, I switch on the alternating current to the electrodes 1—1, engage their tips 2—2 and withdraw them to strike an arc therebetween.

The ionization effected by the flames and the vapour cloud produced by the volatilization of the electrode tips, maintains the arc in flame form. An exceedingly high temperature is produced in the flame due to the combined heat of the gas flames and of the arc or arc flame. The flame 25, jointly produced by the arc and the gas, may be directed upon the work to which the heat is to be applied.

An arc stabilizing resistance 26, or an inductive reactance may be employed if desired in the usual manner.

In addition to the employment of the shields 23, the heat accumulating in the apparatus, after it has been in operation for some time, may be dissipated in various ways as by water-cooling or air-cooling; and if desired, the electrodes 1—1 themselves may be provided with ducts therethrough and cooling mediums circulated therethrough as described in the above mentioned pending application.

As will now be clear, the flame 25 may be projected upon any work, or to perform any operation, when exceedingly high temperatures are required. The flame may be employed to glaze refractory ware and other articles and refractory surfaces and to perform various sintering, fusing and melting opeations in the various arts; and particularly where the material of the electrode 1 is selected as above described such operations may be performed without introducing into the work substances in the nature of impurities.

As an alternative mode of operation, an electrode such as illustrated in Fig. 3 may be employed. This electrode is provided with a passageway 26 entirely therethrough, preferably axially thereof, and at the outer end of the electrode it communicates with a supply pipe 27. Through the passageway 26, air, oxygen, or other noncombustible gas may be blown under pressure, the gas being charged with oxide or metal dust which, upon coming in contact with the flame, is melted and may, by being projected forwardly into the flame 25, be spread or piled up in a molten layer where desired. Highly refractory oxides, such as zirconium dioxide, or compounds thereof, or dust made from the same material as the refractory being heated, may be employed in this manner.

In my copending application above referred to I have described an improved method for making refractory ware and other articles by the application of high temperature to zirconium dioxide combined with specified admixtures of other oxides; and the instant invention may be employed as a source of producing refractory material according to the invention and process in that application.

By suitably directing the flame upon previously formed refractory articles, their surfaces may be glazed, or layers may be deposited thereon, or shapes may be built up by the deposit of layers; and where it is desired to form refractory articles from an admixture of refractory material, such as zirconium dioxide and other oxides mixed therewith, as set forth in said application above referred to, such articles can first be molded from a granular or powdered mixture of the oxides, and then the mass may be fused and melted to form a solid article by heat applied thereto with the flame herein described.

The flame produced and described is particularly useful where it is desirable to employ intense heat in an oxidizing or non-reducing atmosphere, such for example as fusing or melting or glazing refractory oxides, as referred to, and where it is desirable to fuse or melt the work without introducing thereinto impurities from the source of heat.

My invention is not limited to the exact details of construction shown and described nor to the exact steps of process hereinbefore set forth. Many changes and modifications may be made without departing from the spirit of my invention nor sacrificing its advantages and within the scope of the appended claims.

I claim:

1. In an apparatus for producing high temperature flames, a pair of electrodes, means for producing an arc therebetween, means for producing a generally conical gas flame coaxially of each electrode and for blowing the flame into the arc.

2. In an apparatus for producing high temperature flames, a pair of electrodes, means for producing an arc therebetween, a source of combustible gas under pressure, a gas burner supplied by the source and having nozzle means spaced axially from the electrode tips for directing a conical gas flame therefrom about each electrode into the arc.

3. An apparatus for producing high temperature flames as described in claim 2 and in which the burner has a plurality of nozzles spaced axially from the electrode tips inclined toward the arc and from which the gas flame is projected in a plurality of jets toward the arc and forming a conical envelope about each electrode.

4. An apparatus for producing high temperature flames as described in claim 2 and in which the burner has a plurality of nozzles arranged in spaced relation around each electrode axis spaced axially from the electrode tips and inclined toward the axis and from which the gas flame is projected in the plurality of jets toward the arc.

5. In an apparatus for producing high temperature flames, a pair of electrodes, means for forming an arc therebetween, a source of combustible gas under pressure, a gas burner supplied with gas from the source, and having two sets of nozzles each arranged in spaced relation around an axis extending in the general direction of the arc and from which the gas flame is projected in two sets of substantially conical flame jets, the jets of each flame converging toward the arc from points spaced axially from the electrode tips.

6. In an apparatus for producing high temperature flames, a pair of electrodes supported at an angle to each other and relatively movable to engage or disengage arcing end portions thereof, a burner associated with each electrode, means to supply combustible gas under pressure to the burner, and each burner formed to direct the gas, issuing therefrom in a flame in a direction at an angle to the axis of the electrode toward the electrode arcing portion, the burners being mounted for relative movement bodily with their respective electrodes to maintain a predetermined relation of the flames and electrode arcing portions upon relative angular movement of the electrodes.

7. In an apparatus for producing high temperature flames, a pair of electrodes supported at an angle to each other and relatively movable to engage or disengage arcing portions thereof, a burner associated with each electrode, means to supply combustible gas under pressure to the burners, each burner comprising a plurality of relatively spaced nozzles disposed around the corresponding electrode and disposed inwardly from the arcing portions thereof, the nozzles being formed to direct the gas jets issuing therefrom in flame jets convergingly toward the electrode arcing portions, the burners being mounted for relative movement bodily with their respective electrodes to maintain a predetermined relation of the converging flame jets and electrode arcing portions upon relative angular movement of the electrodes.

8. The process of fusing and melting refractory material by utilizing the arc supported on a pair of high resistance electrodes, which includes directing a coaxial conical gas flame upon the electrodes to heat the same to increase their electrical conductivity, forming an arc between the electrodes, expanding the arc into a flame in the ionized atmosphere created by the gas flame and arc and applying the combined heat of the gas flame and arc flame to the material.

9. The method of fusing and melting a zirconium dioxide base refractory in an oxidizing or non-reducing atmosphere substantially without the introduction of impurities therein by utilizing the arc supported on a pair of electrodes comprising zirconium dioxide as a base, which includes directing a gas flame upon the electrodes to heat them to increase their electrical conductivity, forming an arc between the electrodes, expanding the arc into a flame in the ionized atmosphere created at the arc, combining the arc flame and gas flame to form a generally conical flame and directing it upon the material.

10. In an apparatus for producing high temperature flames, a pair of angularly disposed electrodes having intersecting axes, burner means for enveloping each electrode by a generally conical gas flame, means for producing an arc between the electrodes, and means for altering the angle between the electrodes and for maintaining the burner means in flame enveloping relation to the electrodes in all angular positions thereof.

11. In an apparatus for producing high temperature flames, a pair of angularly disposed electrodes having intersecting axes, means for producing an arc between the electrodes, a burner spaced axially along each electrode from the tip formed to encircle each electrode with jets of gas flame converging axially of the electrodes substantially at the arc tips, the electrodes being adjustably movable axially relative to the burner, and means for adjustably altering the angle between the electrodes.

12. The process of fusing and melting refractory material by utilizing the arc supported on a pair of high resistance electrodes, which includes enveloping a substantial length of the electrodes in a conical coaxially disposed gas flame to increase their electrical conductivity, forming an arc between the electrodes, expanding the arc into a conical-shaped flame in the ionized atmosphere created by the gas flame and arc, and applying the combined heat of the gas flame and arc flame to the material.

13. The process of heating a surface which includes producing an arc between a pair of electrodes, directing a conical coaxial gas flame upon each electrode with the cone converging substantially upon the arc, increasing the length of the arc to expand it into a flame in the ionized atmosphere created by the gas flame and arc, and applying the heat of the combined gas and electric flames to the surface.

14. In an apparatus for producing high temperature flames, a pair of elongated angularly disposed electrodes, supporting means longitudinally adjustably supporting the electrodes, movable to engage and disengage the electrode ends, burner means formed to produce a pair of conical flames and supporting means for the burner means movable to dispose the flames substantially coaxial respectively of the electrodes in all positions thereof.

ALEXANDER RAVA.